United States Patent [19]

Freeman

[11] 4,308,137
[45] Dec. 29, 1981

[54] WATER AERATION AND CIRCULATION APPARATUS

[76] Inventor: Peter A. Freeman, Ocean Pines, Rte. #4, Box 2210, Berlin, Md. 21811

[21] Appl. No.: 10,926

[22] Filed: Feb. 9, 1979

[51] Int. Cl.³ .............................. C02F 3/02; C02F 7/00
[52] U.S. Cl. .................................... 210/194; 210/219; 210/242.2; 261/91; 261/120
[58] Field of Search ................. 210/194, 170, 220, 15, 210/219, 221 M, 221 P, 242 A; 261/91, 120; 417/61

[56] References Cited

U.S. PATENT DOCUMENTS

| | | | |
|---|---|---|---|
| 2,180,148 | 11/1939 | Imhoff | 210/194 |
| 2,827,268 | 3/1958 | Staaf | 210/194 |
| 3,856,272 | 12/1974 | Ravitts | 417/61 |
| 4,021,349 | 5/1977 | Kaelin | 210/220 |
| 4,030,859 | 6/1977 | Henegar | 261/91 |
| 4,086,306 | 4/1978 | Yoshinaga | 210/220 |
| 4,089,620 | 5/1978 | Ravitts | 261/91 |
| 4,179,243 | 12/1979 | Aide | 261/91 |

FOREIGN PATENT DOCUMENTS

| | | | |
|---|---|---|---|
| 2408794 | 9/1975 | Fed. Rep. of Germany | 210/220 |
| 1013342 | 7/1952 | France | 210/220 |
| 2398024 | 3/1979 | France | 210/220 |
| 514506 | 12/1971 | Switzerland | 210/220 |

OTHER PUBLICATIONS

Dr. J. E. Alexander "Wind Power and Water Quality".

Primary Examiner—Robert H. Spitzer
Attorney, Agent, or Firm—Emory L. Groff, Jr.

[57] ABSTRACT

Self-contained treatment apparatus for a body of water includes a mounting assembly having flotation elements for fixedly supporting a circulation or agitation device below the surface of the water and driving or motor mechanism above the water surface. Actuation of the motor mechanism operates the circulation or agitation device such that naturally occurring oxygen-saturated water near the surface is drawn downwardly and mixed with the lower oxygen deficient reaches of the body of water and effecting a net increase in dissolved oxygen content. Optionally, actuation of the motor mechanism operates a bubble generator adjacent the water surface so that the air bubbles generated are drawn down with the oxygen-saturated surface water, where oxygen from the bubbles dissolves into the surrounding oxygen-deficient water, thus accelerating the improvement in dissolved oxygen content. Additionally, structure may be included for selective directional control of the oxygen-enriched discharge stream, so that a gentle flushing action can be applied against nutrient-rich sediments, sludges or residues accumulating on the bottom, thereby further improving the water quality.

18 Claims, 5 Drawing Figures

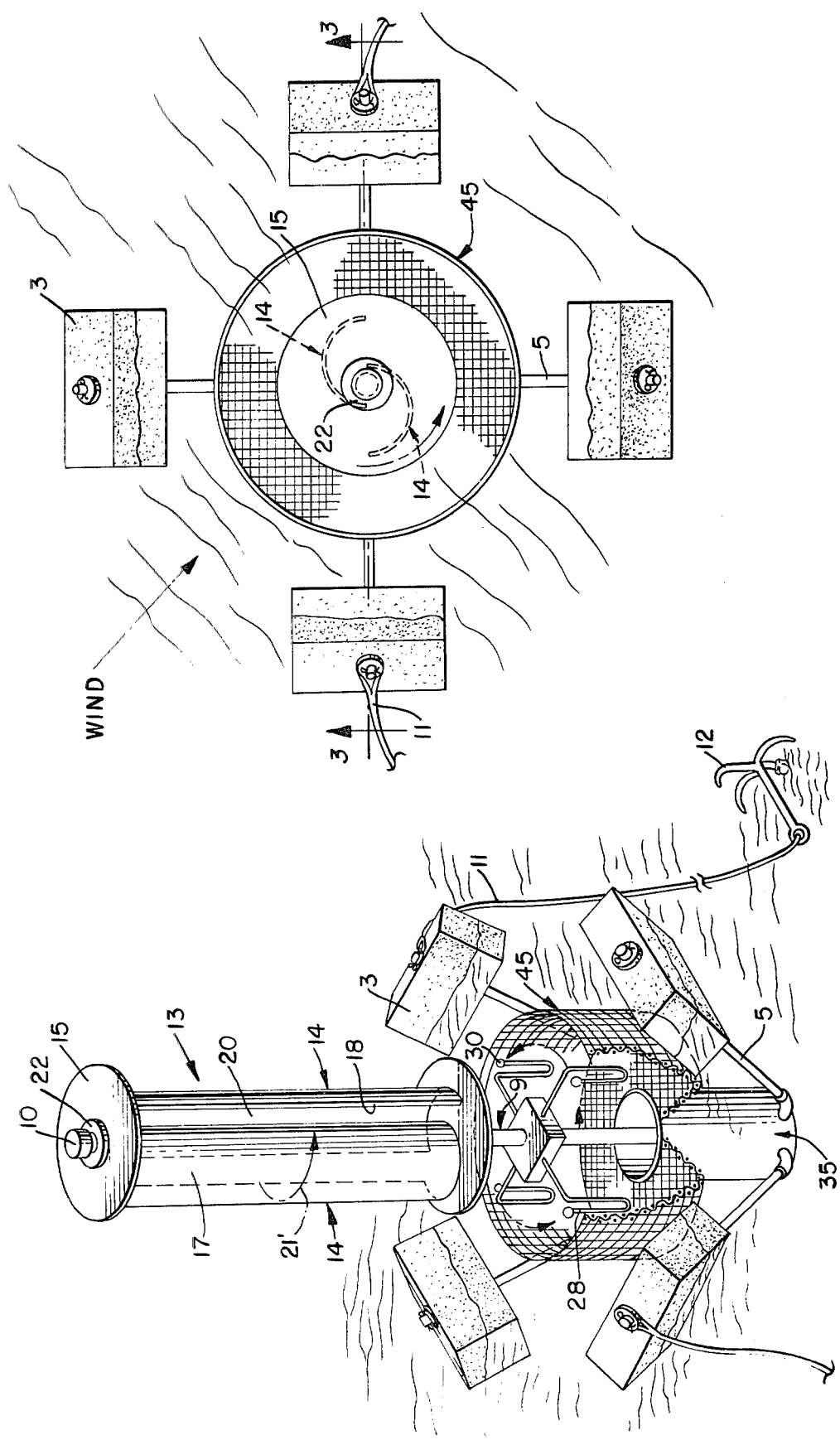

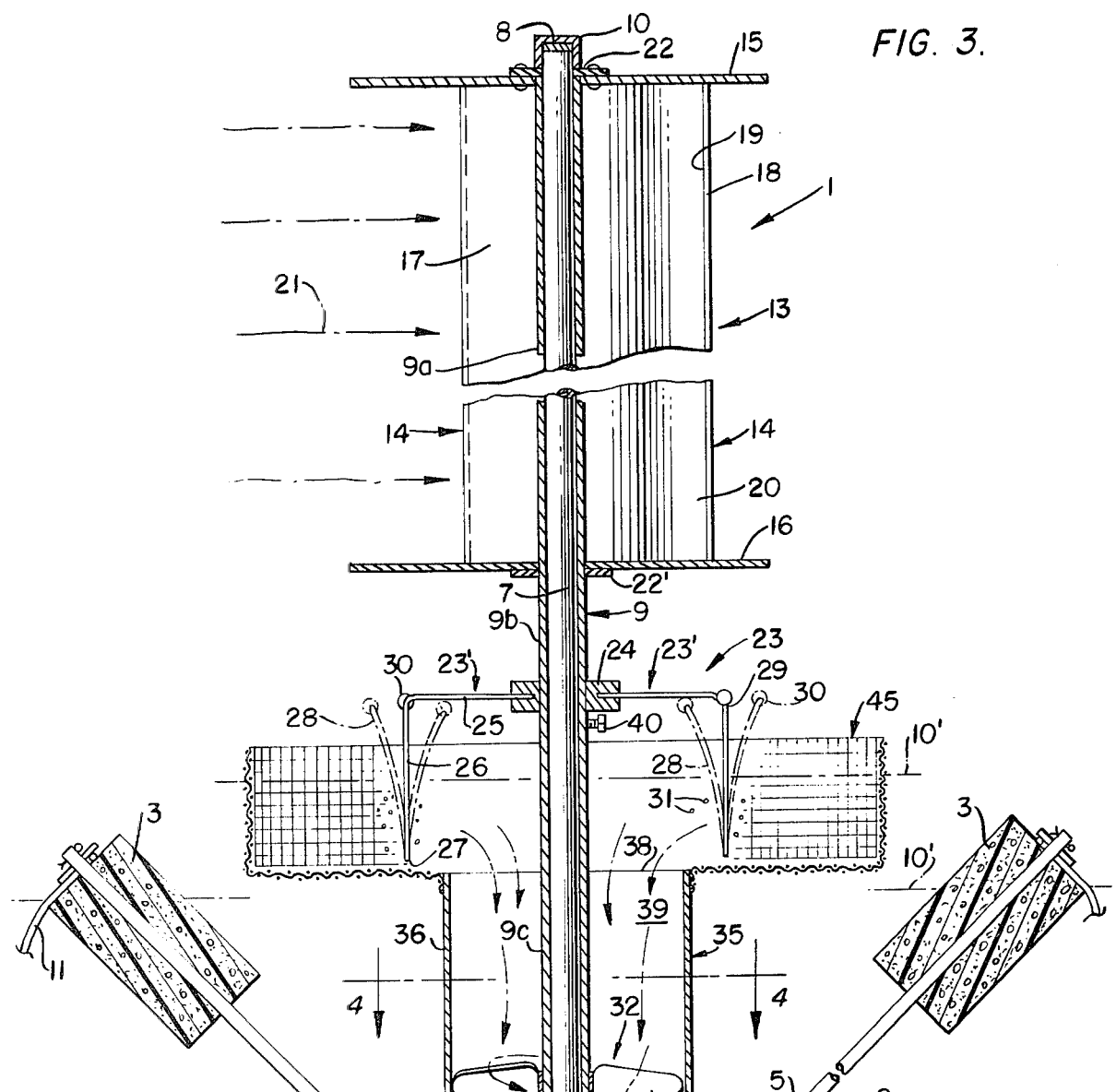
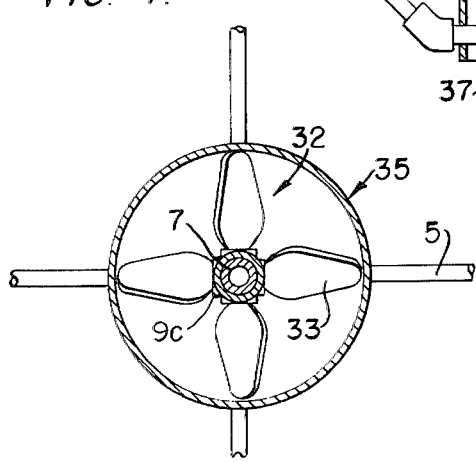
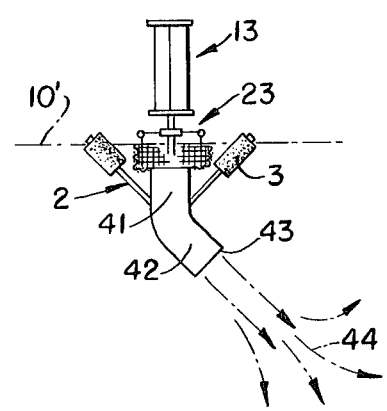
FIG. 3.
FIG. 4.
FIG. 5.

WATER AERATION AND CIRCULATION APPARATUS

This invention relates generally to a water treatment device, and more particularly, to an improved entirely self-contained, portable apparatus for improving and maintaining the water quality in either natural or man-made bodies of water wherein the natural water quality improvement processes are ineffective.

The rising concern for the ecological condition of bodies of water in many areas will be acknowledged. Inadequate aeration and circulation of water is a principal cause of the degradation of water quality in many situations, especially canals and natural estuaries and is directly responsible for a large decline in the level of dissolved oxygen (DO) and/or the increase of nutrient substances in the lower reaches or near the bottom of the water body, with a corresponding decline in the species and population of marine life and often a large increase in undesirable algae therein.

The problem is especially prevalent in dead-end canals which are relatively deep, with more or less rectangular cross-section. A natural estuary on the other hand, is relatively shallow, with a V-bottom configuration. Experience has shown the tidal action in a natural estuary produces considerable water flow at right angles to the center line thereby producing partial drainage and direct aeration and flushing action of the bottom while in a typical canal, insignificant aeration and flushing action occur thereby encouraging accumulation of bottom sediments. The sediments are primarily partially decayed, nutrient-rich vegetable matter which generates a strong biological oxygen demand such that the DO level near the canal bottom remains near zero thus forcing marine animal life to the upper water levels and eventually out of the canals all-together. Ultimately, the zero DO level rises above the canal bottom and the sediment decomposition process changes from aerobic to anaerobic, resulting in highly objectable corrosive and odoriferous products. The presence of nutrients often promotes heavy growths of algae which are unsightly and cause additional disruption in DO levels, further aggravating the problem of maintaining marine animal life.

In the past, static structures have been installed in canals and which, in combination with tidal flow, provided some aeration and flushing action but such structures significantly interfere with water-craft traffic within the canals and are prohibitively expensive. Alternatively, machines have been employed, including both bubbler and impeller types of apparatus. Such latter equipment is likewise very expensive and relies upon high horsepower equipment and additionally, electrical outlets are necessary at interval distances along each canal and the attendant operating cost is substantial.

The present invention provides an improved self-contained, portable device which is relatively inexpensive to manufacture and is highly efficient in its operation. The instant mechanism may be wind-driven thereby resulting in an extremely low cost of maintenance and operation. A single driving unit of the instant device is directly connected to a water circulating or agitation device disposed well below the surface of the body of water and optionally a bubble generator operating at the surface of the body of water. A mount assembly includes floatation and stabilizing means maintaining the assembly in an upright condition in a substantially fixed elevation relative the surface of the body of water throughout variations in the tidal flow or water current so that at all times during the operation of the driving means, the water circulation device induces a downward flow of naturally oxygen-saturated surface water which mixes with oxygen-deficient bottom water effecting a net increase in dissolved oxygen and providing beneficial bottom flushing action in the lower reaches of the canal. Optionally, during the operation of the driving means, the bubble generator augments the action of the water circulation device by introducing small air bubbles into the flow stream from which oxygen dissolves directly into the bottom water. It should be noted that the use of naturally-oxygenated water by this invention enables the provision of oxygenation of the lower reaches of a body of water (and ultimately the whole body of water), at substantially lower operational energy requirements than currently available aeration equipments, which forcibly mix air into water with considerably energy expenditure.

Accordingly, one of the objects of the present invention is to provide an improved water aeration apparatus including a portable, self-contained device having driving means disposed above the level of the water, and directly connected to a water circulation device disposed well beneath the surface of the body of water and optionally, directly connected to a bubble generator operating upon the surface of the water.

Another object of the present invention is to provide an improved aeration apparatus including a wind rotor rotatable about a vertical axis and driving a water circulation device disposed well beneath the surface of the water and optionally, a bubble generator acting upon the surface of the water.

A further object of the present invention is to provide an improved water aeration apparatus including a rotating bubble generator having a plurality of upstanding vibrant arms each disposed with a relatively rigid bottom portion located beneath the surface of the water and an oscillating upper portion disposed above the water surface.

Another object of the present invention is to provide an improved aeration apparatus including rotary driving means disposed above the surface of the water and connected to a water circulation device disposed well below the surface of the water and including an impeller disposed within a relatively fixed shroud and optionally to a bubble generator located adjacent to the surface of the water.

A further object of the present invention is to provide an improved aeration apparatus including driving means disposed above the water level joined to an impeller located well beneath the surface of the water and encased within a shroud having a vertical top section and means to select and control the direction of the circulating flow.

With these and other objects in view which will more readily appear as the nature of the invention is better understood, the invention consists of the novel construction, combination and arrangement of parts hereinafter more fully described, illustrated and claimed.

A preferred and practical embodiment of the invention is shown in the accompanying drawings in which:

FIG. 1 is a top perspective view of a water aeration and circulation or agitation apparatus according to the present invention.

FIG. 2 is a top plan view of the apparatus shown in FIG. 1;

FIG. 3 is an enlarged vertical sectional view taken along the line of FIG. 2;

FIG. 4 is a horizontal sectional view along the line of 4—4 of FIG. 3; and,

FIG. 5 is a side elevation view of a modification of the present invention.

Similar reference characters designate corresponding parts throughout the several figures of the drawings.

Referring now to the drawings, particularly FIG. 1, the present invention will be seen to comprise an entirely self-contained water aeration apparatus, generally designated 1, that may be readily situated within any body of water either natural or man-made, without requiring structural modification associated with the terrain defining the limits of the body of water. Additionally, since the apparatus of FIG. 1 is preferably actuated by means of wind-driven means, there is no requirement for providing electrical supply means to the apparatus.

Stabilization and support of the apparatus is provided by means of the mount assembly, generally designated 2, including a plurality of radiating arms each having a float element 3 carried by its distal portion. Each arm will be seen in FIG. 3 of the drawings to include a base arm or element 4 joined to an upwardly inclined arm 5 with the inner-most portion of each base arm 4 suitably attached to the T fitting 6. Secured to the center of the T fitting 6 is an upwardly extending, fixed inner shaft 7 supporting at the top thereof a suitable thrust bearing 8. The shaft 7 serves to support and maintain an outer rotatable member or sleeve 9 in the illustrated position and includes an end bearing cap 10 engaging the bearing 8 so that the weight of the rotatable sleeve 9 is supported by the upper portion of the fixed inner shaft 7.

With the foregoing structure in mind it will be seen that when the apparatus 1 is disposed within a body of water, the plurality of float elements 3 serve to maintain the centrally disposed shaft 7 and sleeve 9 in a substantially vertically disposed manner with the majority of the axial extent of the shaft 7 and sleeve 9 located above the level of the water surface 10'. By providing at least two anchor lines 11 and associated anchors 12 affixed to the outer ends of the inclined arms 5 of the mount assembly 2, it will be appreciated that the aeration apparatus 1 may be substantially fixedly deployed within a body of water with only enough slack being maintained in the lines 11 to accommodate any expected tidal and wave motion.

Although any suitable drive means may be employed to impart rotatable motion to the sleeve member 9 it is preferable that a highly efficient and economical mechanism such as a wind-driven rotor 13 be attached to the upper portion 9a of the sleeve. This sleeve upper portion will be seen to be disposed entirely above the level of the water surface 10' for reasons which will become obvious hereinafter. Experience has shown that an efficient drive or motor means is possible by utilizing a wind rotor of the vertical-axis type, such as the "Savonius" rotor or alternately, a horizontal axis (screw propellor) type with suitable right-angle transmission and stabilizing vane. For the purpose of describing the operation of this invention, a "Savonius" air rotor is shown in FIGS. 1 through 5 and comprises two or more vanes 14 vertically disposed between the top plate 15 and bottom plate 16. Each blade 14 includes a curved outer wall 17, an exposed blade edge 18 and a curved inner wall 19 defining a cavity 20 terminating adjacent the exterior periphery of the rotatable sleeve upper portion 9a.

With the foregoing structure in mind it will be seen that each of the vertically extending cavities 20 serves as an airfoil capable of reacting to wind current as reflected by the lines 21 of FIG. 3, with a resultant counter-clockwise rotation being imparted to the wind rotor 13 as depicted by the arc 21' in FIG. 1.

The assembly of the plurality of blades or vanes 14 and the plates 15 and 16 will be understood to be rigidly affixed to the upper portion 9a of the sleeve 9 and by means of appropriate mounting collars 22 and 22' such that upon rotation of the wind rotor 13 the entire sleeve is rotated concurrently therewith. Rigidly affixed to the sleeve 9 is a water circulation or agitation device, preferably in the form of an impeller 32 comprising a plurality of impeller blades 33 mounted upon the hub 34 suitably affixed to the lower portion 9c of the rotatable sleeve 9. To enhance the flow of the oxygen-enriched water adjacent the surface 10' from the upper area of the body of water to the bottom thereof, a shroud 35 comprising a vertically disposed cylindrical wall 36 is mounted in surrounding relationship to the impeller 32 and may be suitably fixedly disposed adjacent its bottom opening 37 to the base arms 4 of the mount assembly 2. The top opening 38 of the shroud 35 is at a level somewhat below the water surface 10'. Attached to the shroud by suitable means is a circumferential screen 45, which extends vertically from the top elevation of the shroud to above the water surface 10', whose purpose is to prevent waterborne debris from entering the shroud 35 and fouling the impeller 32. With this in mind it will be seen that a water channel 39 is formed within the shroud and assists in most efficiently directing the oxygen-enriched water downwardly through the shroud towards the bottom of the body of water as the impeller 32 is rotated concurrently with the sleeve 9. In turn, the oxygen-enriched water mixes with the oxygen-deficient bottom water, effecting a net increase in the level of dissolved oxygen in the lower reaches of the body of water.

Optionally, also rigidly affixed to the central portion 9b of the sleeve 9 is a bubble generator, generally designated 23 and which includes a plurality of radiating resonant assemblies 23', each secured to the sleeve control portion 9b by means of a hub or mounting collar 24. Each resonant assembly 23' includes a unitary wire construction comprising a horizontal radial arm 25, a depending arm 26 formed with a bottom-most bend 27, and an upstanding vibrant arm 28 terminating in a free oscillating end 29 disposed at an elevation substantially arcuately adjacent the outer terminus of the radial arm 25. As will be seen most clearly in FIG. 1 of the drawings, when the bubble generator 23 is in a stationary, at-rest condition, each upstanding vibrant arm 28 and its adjacent depending arm 26 are disposed in a vertical plane substantially equi-spaced from the center of the fixed shaft 7 and rotatable sleeve central portion 9b.

The free end 29 of each resonant assembly 23' is provided with an enlarged mass 30. With this in mind, it will be appreciated that, upon rotation of the bubble generator 23, the inherent resilience of the wire forming each resonant assembly 23' produces an oscillation, as shown in FIG. 3 of the drawings, of all of the vibrant arms 28. This oscillating movement about the bends 27, in a radial direction, as the bubble generator rotates about the fixed shaft 7, produces a churning action below the water surface 10' and results in the generation of a plurality of small air bubbles 31. These bubbles are entrained in the water flow through the shroud and also mix with the bottom water.

This action augments the previously described dissolved oxygen improvement process in the bottom water level as oxygen also dissolves from the bubbles into the oxygen-deficient bottom water. This improved measure of oxygenated water is of course more pressingly needed in the lower reaches of the body of water, wherein oxygen starvation is often a critical problem with an attendant buildup of malodorous anaerobic vegetative sludge on the bottom.

Although the motor means for driving the aeration apparatus is illustrated as comprising a wind-driven rotor 13 it will be appreciated that alternate driving means, such as an electric motor, may be substituted. Additionally, the combination of a wind rotor and electric motor may be employed whereby during the absence of sufficient wind, the electric motor would automatically initiate rotation of the sleeve 9. In any case it will be understood that the sleeve 9 provides connecting means serving to join, as one rotable unit, the driving means 13, circulation device 32, and optionally, the bubble generator 23.

Means may be provided for adjustably positioning the elevation of the bubble generator 23 relative the balance of the apparatus, such as by employing a fastener 40 allowing vertical displacement of the bubble generator mounting collar 24 before securing same relative the exterior of the rotatable sleeve 9 thereby permitting regulation of the oscillation of the upstanding vibrant arms 28 to obtain the most effective generation of air bubbles 31.

The embodiment illusrated in FIG. 5 of the drawings discloses a typical means whereby the oxygen-rich flow passing through the shroud can be given a selectable, directional control. In this arrangement, an alternative directional shroud having a top vertical section 41 is joined to a bottom offset section or elbow 42 such that an angular bottom opening 43 is provided enabling the desired selective directional control, as reflected by the arrows 44. It should be noted that this same function can be supplied through arrangements of vanes and/or deflectors inserted in the flow stream. The selectable directional control arrangement has particular merit in installations where a gentle, directional flushing action is desired to transport sediments, sludges, residues etc. from closed ends or stagnant sections of canals or other water bodies, in addition to the dissolved oxygen improvement function already noted. The combined action of DO improvement and bottom flushing can thus be made to closely simulate the water quality maintenance process of tidal action in a natural estuary.

I claim:

1. A self-contained treatment apparatus for a body of water provided with a surface and having naturally oxygen-enriched surface water disposed atop lower reaches of oxygen deficient water including, a mount assembly having a base element disposed below the water surface, water circulation means including an impeller disposed substantially below said water surface, driving means connected to said impeller and disposed above said water surface, vertically extending connecting means joining said driving means and impeller, said driving means including a wind-driven rotor, a shroud defining a vertical interior water channel of substantial diameter surrounding said impeller and at least a portion of said connecting means, said shroud having top and bottom openings, said top opening adjacent to yet fully spaced beneath said water surface and said bottom opening disposed beneath said impeller, said shroud top opening disposed in an unobstructed manner relative said water surface thereabove to allow unimpeded ingress of water from said surface therethrough whereby, operation of said wind-driven rotor actuates said impeller to circulate naturally oxygen-enriched surface water from said water surface radially adjacent and above said shroud top opening in a substantially non-impeded manner downwardly through said shroud water channel and through said bottom opening to the lower reaches of said body of water.

2. A water treatment apparatus according to claim 1 wherein, said mount assembly includes radially disposed stabilizing means maintaining said connecting means substantially vertically disposed.

3. A water treatment apparatus according to claim 2 wherein, said stabilizing means includes a plurality of arms extending from said base element.

4. A water treatment apparatus according to claim 3 including, a float element adjacent the distal portion of each said arm.

5. A water treatment apparatus according to claim 1 wherein, said mount assembly includes flotation elements maintaining said apparatus suspended in said body of water at a substantially constant elevation therewithin.

6. A water treatment apparatus according to claim 1 including, vertically disposed means supporting said connecting means for rotatable motion.

7. A water treatment apparatus according to claim 6 wherein, said vertically disposed means includes a shaft fixed relative said mount assembly and said connecting means includes a sleeve surrounding said shaft.

8. A water treatment apparatus according to claim 1 wherein, said shroud includes a top vertically disposed section surrounding said impeller and a bottom laterally offset section.

9. A water treatment apparatus according to claim 1 including, a screen extending from adjacent said shroud top opening to a level above said water surface.

10. A water treatment apparatus according to claim 1 wherein, said rotor is of the Savonius type.

11. A self-contained treatment apparatus for a body of water including, a mount assembly having a base element disposed below the water surface, water circulation means including an impeller disposed substantially below said water surface, driving means connected to said impeller and disposed above said water surface, vertically extending connecting means joining said driving means and impeller, a shroud defining a vertical interior water channel of substantial diameter surrounding said impeller and at least a portion of said connecting means, said shroud having top and bottom openings, said top opening well-spaced beneath said water surface and said bottom opening disposed beneath said impeller, a bubble generator attached to said connecting means adjacent said water surface intermediate said driving means and shroud top opening, whereby, operation of said driving means actuates said impeller to circulate naturally oxygen-enriched surface water from said water surface adjacent said shroud top opening downwardly through said shroud water channel and through said bottom opening to the lower reaches of said body of water.

12. A water treatment apparatus according to claim 11 wherein, said driving means includes a motor for rotating said joined connecting means.

13. A water treatment apparatus according to claim 12 wherein, said motor comprises a wind-driven rotor.

14. A water treatment apparatus according to claim 13 wherein, said wind-driven rotor includes a plurality of vertically disposed vanes.

15. A water treatment apparatus according to claim 14 wherein, said vanes are curved in horizontal section and each pair of adjacent said vanes define a cavity therebetween.

16. A self-contained treatment apparatus for a body of water including, a mount assembly having a base element disposed below the water surface, water circulation means including an impeller disposed substantially below said water surface, driving means connected to said impeller and disposed above said water surface, vertically extending connecting means joining said driving means and impeller, said driving means including a wind-driven motor, a shroud defining a vertical interior water channel of substantial diameter surrounding said impeller and at least a portion of said connecting means, said shroud having top and bottom openings, said top opening well-spaced beneath said water surface and said bottom opening disposed beneath said impeller, a bubble generator attached to said connecting means adjacent said water surface and intermediate said driving means and shroud top opening whereby, operation of said wind-driven rotor actuates said impeller to circulate naturally oxygen-enriched surface water from said water surface adjacent said shroud top opening downwardly through said shroud water channel and through said bottom opening to the lower reaches of said body of water.

17. A water treatment apparatus according to claim 16 wherein, said bubble generator includes a plurality of resonant assemblies each having oscillating means passing through said water surface.

18. A water treatment apparatus according to claim 17 wherein, each said resonant assembly includes a radial arm, a depending arm extending from said radial arm, and said oscillating means comprises a vibrant arm extending from said depending arm.

* * * * *